BERTRAND & SAMES.
Wheel-Cultivator.
No. 54,099.
Patented Apr. 24, 1866.
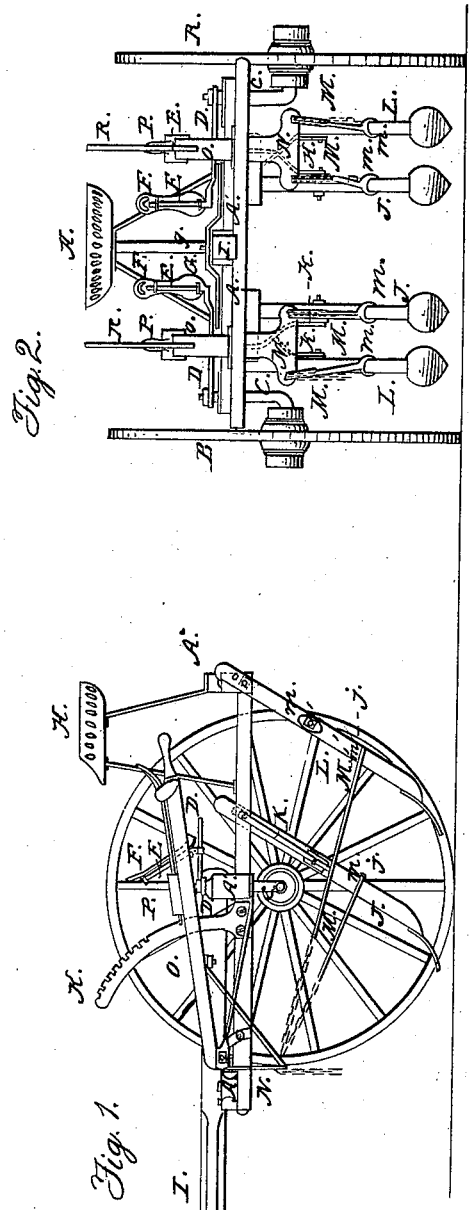
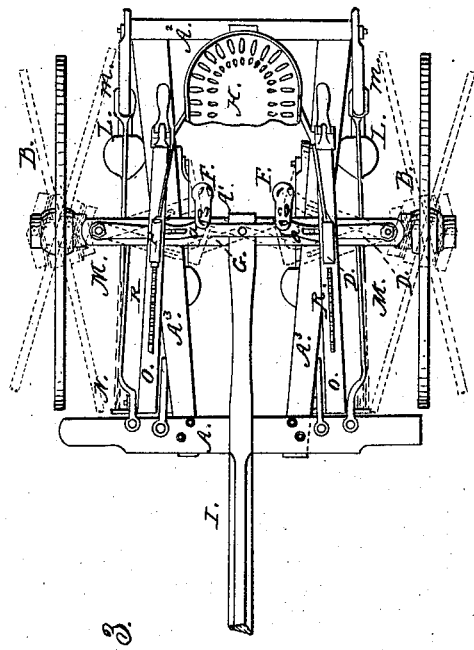

UNITED STATES PATENT OFFICE.

THEOPHILUS F. BERTRAND AND PETER SAMES, OF ROCKFORD, ILLINOIS.

IMPROVEMENT IN CULTIVATORS.

Specification forming part of Letters Patent No. 54,099, dated April 24, 1866.

*To all whom it may concern:*

Be it known that we, THEOPHILUS F. BERTRAND and PETER SAMES, both of Rockford, in the county of Winnebago and State of Illinois, have invented a new and useful Improvement in Cultivators, of which the following is a full, clear, and exact description, reference being had to the accompanying drawings, which make part of this specification, in which—

Figure 1 represents a side view, Fig. 2 a front view, and Fig. 3 a plan view, of a cultivator embracing our improvement.

Our invention relates more particularly to that class of cultivators in which a rigid frame, carrying the driver, plows, and mechanism, is mounted upon two wheels, one of which runs on each side of the row to be cultivated.

In the accompanying drawings, a stout frame, A A' $A^2$ $A^3$, is shown as mounted upon two wheels, B. The frame consists of a front cross-beam, A, projecting on each side, an axle-beam, A', and an arched rear cross-beam, $A^2$, all these being rigidly connected by two side timbers, $A^3$, slightly diverging from front to rear.

The wheels B are mounted on independent axles C, bent up vertically, and passing through the axle-beam A', so as to turn freely therein. By this means the angles of the wheels to the frame can be varied, as shown by the red and blue lines in Fig. 3. To render this variation in the angle of the wheels coincident and capable of being controlled by the driver we attach bent levers D to the top of the axle-spindle C, and extend them toward the center of the machine, their inner ends being bent backward and horizontally. Inclined rods E are secured upon the bent ends of these levers by set-screws, so as to permit them to be adjusted nearer to or farther from the driver's seat. Shoes F, for the feet of the driver, are secured to these rods by eyebolts, which permit them to turn slightly around the rods.

An evener or balance-lever, G, turning horizontally on a pivot, $g$, on the axle-beam, carries pins on its ends which play in slots $d$, on the bent lever. The driver can thus control the angle of the wheels to the frame, while they are always kept parallel to each other.

A seat, H, for the driver is secured upon the frame behind the wheels. A tongue, I, is rigidly secured to the frame.

The front plows, J, are pivoted to the inner sides of the side timbers, $A^3$, so as to play freely in a vertical plane upon bolts passing through the timbers. Braces K K extend from the pivots about half-way down the legs of the plow-standards, their ends being rounded, so as to play in eyebolts passing through grooved blocks and through the standards, and adjusted by nuts and screws, by which means we are enabled to vary the angle of the plows so as to throw the earth upon or away from the rows.

The rear plows, L, are pivoted to the outside of the side pieces, and are braced in the same way as the front ones.

Each standard has an eye, $j$, in the back, through which a loop, $m$, of one of the draft-rods or chains passes. These loops encircle the standards, and the pull always coming on the eyebolt at the back a center draft is always maintained, even when the plows are set at an angle.

The draft rods or chains M are attached to T-heads N below the frame, and their length can readily be adjusted by slipping their links into slots in the T-heads which form parts of lifting-levers O, pivoted to play vertically in the front of the frame, and reaching back to the driver's seat. The raising and lowering of these levers correspondingly elevates or depresses the plows, which can be retained at any desired position by spring-detents P taking into the teeth of curved racks R on the frame. There being two independent sets of levers and plows it will be seen that the plows on one side of the row can be raised out of the ground while those on the other are working, or those of one side may be higher than the other, which is often necessary in hilly ground.

When working the driver rides upon his seat and guides the team. His feet rest upon the shoes, and by working them back and forth he changes the angle of the team and shifts the position of the machine relatively to the crop, while by raising or lowering one or both of the lifting-levers he raises or lowers the plows as required.

What we claim as our invention, and desire to secure by Letters Patent, is—

1. The combination of the plows, draft-rods, and elbow-levers O with the frame and driver's seat, when constructed, arranged, and operating as described.

2. The combination of the standard, brace, eyebolt, and grooved block, when constructed and arranged as described, to vary the angle of the plow to the crop, as set forth.

3. The combination of the standard, eyebolt $j$, loop $m$, and draft-rod M, constructed and arranged as described, to secure center draft when plowing at an angle to the crop.

In testimony whereof we have hereunto subscribed our names.

THEOPHILUS F. BERTRAND.
PETER SAMES.

Witnesses:
 DUNCAN FERGUSON,
 ALONZO COREY.